United States Patent
Angrick et al.

(10) Patent No.: US 11,223,251 B2
(45) Date of Patent: Jan. 11, 2022

(54) PERMANENT MAGNET ENERGIZED MOTOR WITH ROTATABLE BAR MAGNETS

(71) Applicant: Schaeffler Technologies AG & Co. KG, Herzogenaurach (DE)

(72) Inventors: Carsten Angrick, Appenweier (DE); Wolfgang Reik, Bühl (DE); Matthias Gramann, Renchen (DE); Peter Schwanemann, Bühl (DE); Miriam Engler, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 108 days.

(21) Appl. No.: 16/625,984

(22) PCT Filed: May 25, 2018

(86) PCT No.: PCT/DE2018/100511
§ 371 (c)(1),
(2) Date: Dec. 23, 2019

(87) PCT Pub. No.: WO2019/001623
PCT Pub. Date: Jan. 3, 2019

(65) Prior Publication Data
US 2020/0127510 A1    Apr. 23, 2020

(30) Foreign Application Priority Data

Jun. 27, 2017 (DE) .................... 10 2017 114 245.2

(51) Int. Cl.
*H02K 21/16* (2006.01)
*H02K 1/27* (2006.01)
*H02K 21/02* (2006.01)

(52) U.S. Cl.
CPC ......... *H02K 1/2766* (2013.01); *H02K 21/029* (2013.01); *H02K 21/16* (2013.01); *H02K 2213/09* (2013.01)

(58) Field of Classification Search
CPC .... H02K 21/028; H02K 21/029; H02K 1/276; H02K 1/2766
See application file for complete search history.

(56) References Cited

U.S. PATENT DOCUMENTS 3,360,667 A    12/1967 Gordon, Jr.
8,072,108 B2 *  12/2011 Finkle .................... H02K 1/276
                                                                310/156.24
(Continued)

FOREIGN PATENT DOCUMENTS

CH        196443 A     3/1938
CN     102055292 A     5/2011
(Continued)

*Primary Examiner* — Dang D Le
(74) *Attorney, Agent, or Firm* — Lekeisha Suggs (57) ABSTRACT

A rotor for an electrical machine includes a rotor body and an axis of revolution which extends in an axial direction and about which the rotor body is rotatable. The rotor further includes an outer casing surface which delimits the rotor body, at least one pole arrangement, and a movement mechanism for the at least one pole arrangement. The movement mechanism is designed such that the at least one pole arrangement is movable about a rotation axis which is oriented substantially parallel to the axis of revolution of the rotor. The at least one pole arrangement is also movable about the rotation axis in addition to rotation about the axis of revolution of the rotor.

7 Claims, 4 Drawing Sheets

(56) References Cited

U.S. PATENT DOCUMENTS

2011/0101811 A1  5/2011  Finkle et al.
2012/0074913 A1  3/2012  Finkle

FOREIGN PATENT DOCUMENTS

| | | |
|---|---|---|
| CN | 102474141 A | 5/2012 |
| CN | 103404001 A | 11/2013 |
| CN | 205693465 U | 11/2016 |
| EP | 2148407 A1 | 1/2010 |
| GB | 495813 A | 11/1938 |
| JP | 2002315244 A | 10/2002 |
| JP | 2004336915 A | 11/2004 |
| JP | 2011015476 A | 1/2011 |
| JP | 4823821 B2 | 11/2011 |
| WO | 2003044927 A1 | 5/2003 |
| WO | 2011048464 A1 | 4/2011 |
| WO | 2011053472 A2 | 5/2011 |
| WO | 2011053473 A2 | 5/2011 |

\* cited by examiner

PERMANENT MAGNET ENERGIZED MOTOR WITH ROTATABLE BAR MAGNETS

CROSS-REFERENCE TO RELATED APPLICATIONS

This application is the U.S. National Phase of PCT Appln. No. PCT/DE2018/100511 filed May 25, 2018, which claims priority to DE 10 2017 114 245.2 filed Jun. 27, 2017, the entire disclosures of which are incorporated by reference herein.

TECHNICAL FIELD

The disclosure concerns a motor of an electrical machine, and an electrical machine with a rotor and a stator surrounding the rotor.

BACKGROUND

The design of electric motors for example, or an electrical machine, is always a compromise between various requirements. In permanent magnet energized motors in particular, the magnetic field of the rotor—due to its operational design—is unchangeable and cannot therefore be adjusted optimally with respect to operating point, such as for example in a power-energized synchronous machine.

SUMMARY

It is therefore an object of the present disclosure to specify a rotor of an electrical machine, and an electrical machine with a rotor and stator, which implement a switching facility, in particular in a rotor of a preferably permanent magnet energized electrical machine, in order to be able to adjust the magnetic rotor flux optimally with respect to operating point.

This object is achieved by the disclosure with the features described in the claims. Further advantageous embodiments are described herein.

According to the disclosure, in a first aspect of the present disclosure, a rotor for an electrical machine comprises:
  a rotor body,
  an axis of revolution which extends in the axial direction and about which the rotor body can be rotated,
  an outer casing surface which preferably delimits the rotor body,
  at least one pole arrangement.

In embodiments, the rotor is a rotor of an electrical machine configured as an internal rotor or external rotor motor.

In embodiments, the at least one pole arrangement is arranged in or on the rotor body. Thus the at least one pole arrangement moves or rotates with the rotor body, so that preferably the two together execute a rotation about the axis of revolution of the rotor.

In embodiments, the rotor, in particular the rotor body, comprises a movement mechanism for the at least one pole arrangement.

In embodiments, the movement mechanism is designed such that the at least one pole arrangement is movable about a rotation axis which preferably is oriented substantially parallel to the axis of revolution of the rotor. In this way, the at least one pole arrangement is also movable about its rotation axis, in addition to the rotation about the axis of revolution of the rotor. In other words, by means of the movement mechanism, the at least one pole arrangement can be moved relative to the rotor body, whereby as a result, a relative positioning of the at least one pole arrangement and rotor body is possible.

The term "substantially parallel" in the present description preferably means that the rotation axis of the at least one pole arrangement lies within a cylinder of diameter of 0.05 to 10 mm which is arranged parallel to the axis of revolution of the rotor.

It is also advantageous if the term "substantially parallel" in the present description is understood to mean that the axis of revolution of the rotor lies within a cylinder of diameter 0.05 to 10 mm which is arranged parallel to the rotation axis of the at least one pole arrangement.

Furthermore, it is preferred that the movement mechanism comprises an actuator for moving the at least one pole arrangement.

In embodiments, the movement mechanism comprises a hydraulically or pneumatically operable actuator, or an electrical actuator, in particular an electric motor. In this way, the at least one pole arrangement can easily be moved relative to the rotor body.

It is also advantageous if the movement mechanism comprises at least one lock for the at least one pole arrangement. Thus the relative position of the at least one pole arrangement to the rotor body can easily be delimited or fixed or established.

In embodiments, the at least one lock is configured in the manner of an external brake which acts on the at least one pole arrangement from the outside in order to limit its movement.

It is furthermore advantageous if the at least one lock has various adjustment positions. Thus various relative positions can be established between the at least one pole arrangement and the rotor body. The adjustment positions are preferably predefinable positions of the at least one pole arrangement relative to the rotor body.

It is also advantageous if the at least one lock has at least a first and a second adjustment position. In this way, at least two different relative positions can be established between the rotor body and the pole arrangement.

In embodiments, in one adjustment position, the distance between a first pole body element of a pole arrangement and the outer casing surface is less than the distance between a second pole body element of the pole arrangement and the outer casing surface. In this connection, it is advantageous if the at least one pole arrangement is composed of the first pole body element which preferably has a magnetic north or south pole, and the second pole body element which preferably has a magnetic south or north pole.

The term "distance" in the present description means preferably the shortest connection or connecting line between the casing surface of the rotor or its rotor body, and a pole body element or the at least one pole arrangement. Here it is advantageous if the shortest connecting line extends in the radial direction.

Furthermore, it may be provided that the movement mechanism is arranged between the axis of revolution of the rotor or rotor body and the at least one pole arrangement, which is preferably spaced from the axis of revolution in the radial direction. Thus the centripetal acceleration on the movement mechanism can be kept low.

In embodiments, the movement mechanism is arranged between the outer casing surface of the rotor body and the at least one pole arrangement, which is preferably spaced from the outer casing surface in the radial direction. This arrangement allows the centripetal acceleration for the movement mechanism to be utilized, in order for example to supply the latter with energy so that it can displace or move the at least one pole arrangement from one adjustment position to another adjustment position.

It is also advantageous if the movement mechanism is formed as a hollow cylinder in order to receive the at least one pole arrangement in its interior. In other words, it is advantageous if the movement mechanism is formed as a bore or a receiver or similar inside the rotor body, so that the at least one pole arrangement can be arranged inside the bore/receiver.

In other words, it is advantageous if the rotor body comprises one bore per pole arrangement which at least partially forms the movement mechanism.

In embodiments, the movement mechanism comprises its own axis of revolution, in particular a rotation axis. The rotation axis is preferably an axis about which the movement mechanism is formed to be rotationally symmetrical.

Again, expressed in other words, it is preferable if the movement mechanism is formed symmetrically, in particular rotationally symmetrically to its rotation axis. In this way for example, a pole arrangement can be rotated by means of the movement mechanism.

In embodiments, the movement mechanism comprises a bearing unit via which the at least one pole arrangement is freely rotatable. In other words, it is preferred if the movement mechanism comprises a roller bearing or a plain bearing which guarantees a rotation of the at least one pole arrangement, which is preferably arranged on or inside the movement mechanism.

Again, expressed in other words, it is advantageous if the at least one pole arrangement or its pole body element can be twisted fully variably so that a continuous adjustment is possible. Thus it is possible to rotate the at least one pole arrangement or pole body element either all simultaneously or individually or in groups. The rotation may thus take place either discretely (i.e. for example in just two positions) or continuously adjustably or in defined intermediate steps. Maximum flexibility allows a corresponding better controllability but also requires corresponding actuation.

Furthermore, it is advantageous if the movement mechanism comprises a bearing unit in which at least one magnetic and/or a magnetizable and/or non-magnetic pole body element of the at least one pole arrangement can be received in rotatable fashion. Thus the at least one pole arrangement consisting of at least one pole body element can rotate relative to the rotor body.

Furthermore, it is preferred if the at least one pole arrangement comprises a magnetic and/or magnetizable pole. Thus the at least one pole arrangement may be configured so as to be magnetic.

In embodiments, the at least one pole arrangement has a first pole and/or a second pole. The poles are advantageously magnetic poles.

In embodiments, the at least one pole arrangement comprises at least one magnetic pole body element, in particular a permanent magnet, and/or a magnetizable and/or non-magnetic pole body element.

Advantageously, at least one pole body element forms a pole arrangement.

It is also advantageous if the at least one magnetic and/or magnetizable pole body element is configured in cuboid shape, preferably as a bar.

In embodiments, the at least one pole arrangement is configured as a rotatable bar.

It is also advantageous if several pole body elements, in succession in a row or as a bar, form the at least one pole arrangement.

It is also advantageous if several pole elements together form a cross-sectional form or surface of the at least one pole arrangement.

In embodiments, the at least one pole arrangement has a circular cross-sectional surface.

It is also advantageous if the at least one pole arrangement is formed from at least two pole body elements which preferably each form half the shape of the at least one pole arrangement, in particular in cross-section and/or longitudinal section.

Furthermore, it is preferable if the at least one pole arrangement has a symmetrical shape, of which the geometric center and the center of mass coincide in order to allow rotation about a rotation axis.

Furthermore, it is preferable if the at least one pole arrangement comprises a rotation axis which is preferably oriented substantially parallel to the axis of revolution.

Furthermore, it is possible that at least three pole arrangements form a V-shaped arrangement or a spoke-like arrangement.

Advantageously, the at least three pole arrangements have different distances from the outer casing surface of the rotor or rotor body, wherein only the two pole arrangements with the smallest distance from the outer casing surface are movable about their rotation axis. Thus the number of pole arrangements and the technical complexity for implementing a movement mechanism can be reduced.

It may also be provided that the rotor or its rotor body comprises at least one magnetic flux block. This may block the magnetic flux in order to reduce magnetic flux leakage.

In embodiments, the at least one magnetic flux block is arranged between two pole arrangements.

In embodiments, the at least one magnetic flux block extends in the radial direction and/or in the circumferential direction.

The at least one magnetic flux block is preferably formed as an air gap or as a plastic part.

A second aspect of the present disclosure concerns an electrical machine with a rotor and a stator.

It is expressly pointed out that the features of the rotor, as explained in relation to the first aspect, may be applied either individually or in combination with each other in the electrical machine.

In other words, the features concerning the rotor, which are cited above in relation to the first aspect of the disclosure, may also be combined with further features under the second aspect of the disclosure.

Advantageously, the electrical machine comprises a rotor, preferably with features according to the first aspect, and a stator surrounding the rotor.

In embodiments, the rotor and the stator are spaced apart from each other in the radial direction in order to form an air gap between the two.

It is also advantageous if the electrical machine comprises an axis of revolution about which the rotor can be rotated, wherein preferably the rotor has a rotor body and preferably an outer casing surface which delimits the rotor or its rotor body.

Advantageously, the rotor comprises at least one pole arrangement and a movement mechanism for the at least one pole arrangement.

It is also advantageous if the at least one pole arrangement comprises a magnetic and/or magnetizable pole.

In embodiments, the movement mechanism is configured such that the at least one pole arrangement is movable about a rotation axis of the movement mechanism which is preferably oriented substantially parallel to the axis of revolution of the rotor. In this way, the magnetic and/or magnetizable pole of the pole arrangement is formed so as to be rotatable relative to the stator and the rotor or its rotor body.

It is furthermore advantageous if the stator comprises at least one stator pole arrangement for generating a magnetic field.

In embodiments, the movement mechanism has at least one lock for the at least one pole arrangement.

It is also advantageous if the lock comprises at least a first and a second adjustment position, wherein preferably, in the first adjustment position, a first pole of the at least one pole arrangement is oriented towards the stator.

Advantageously, in the second adjustment position, a second pole of the at least one pole arrangement is oriented towards the stator.

Furthermore, it is advantageous if, within a definable time interval, the at least one stator pole arrangement can generate an electromagnetic counter-field to the electromagnetic field of the at least one pole arrangement of the rotor. In this way, preferably after release of the at least one lock in the first adjustment position, the pole arrangement can be rotated according to the forces produced by the electromagnetic fields, whereby the at least one pole arrangement can be rotated into the second adjustment position and then locked.

The inventive concept outlined above is also expressed in other words below.

This concept concerns, to put it simply, a rotor of an electrical machine with a movement mechanism, which is advantageously configured such that at least one pole arrangement is movable about a rotation axis which is oriented substantially parallel to the axis of revolution of the rotor, whereby the at least one pole arrangement can also be moved about its rotation axis in addition to the rotation about the axis of revolution of the rotor.

The inventive concept is based on the object of creating a switching facility in rotors of permanent magnet energized motors, in order to be able to adjust the rotor flux optimally with respect to operating point.

In this way, the following objectives can be achieved:
 a reduction in the induced voltage to the permitted maximal voltage in the event of a fault (critical for motors operated greatly in field weakening, e.g. in 48 V systems);
 a reduction in motor losses due to a reduction in the effective rotor flux for operation of the motors at high rotation speeds (thus a smaller field weakening current is required, whereby preferably firstly copper losses can be reduced and also less reactive power is required in the electronics; secondly, preferably, the re-magnetization losses in the motor core are reduced);
 a switching of the number of pole pairs in operation (this allows higher operating frequencies and operation with lower losses).

In order to achieve the above objectives, it is advantageous if magnets or pole arrangements of the motor or the electrical machine are configured as rotatable bars. Accordingly, all magnets or pole arrangements can be oriented individually by rotation as required.

Orientation takes place preferably either by corresponding strength of the stator field, and/or preferably by a mechanical device or movement mechanism.

In embodiments, the magnets or pole arrangements or their pole body elements are designed as rotatable bars. Either all magnets may be designed to be rotatable, or also only a limited number of magnets.

In the case of a V-shaped arrangement of the pole arrangements, it is advantageous for example if only the magnets or pole arrangements close to the air gap are designed to be rotatable.

It is also preferred if the bar magnets or pole arrangements either consist completely of magnetic material or are constructed from several parts, wherein preferably one part comprises rectangular magnets, one part comprises soft magnetic material, and one part comprises air and/or non-magnetic material, e.g. plastic which can then serve as a magnetic flux block. This has the advantage that the magnetic flux can be guided optimally already inside the pole arrangement, and short-circuits of the magnetic field lines (flux leakage) can be avoided or reduced.

It is furthermore advantageous if the bar magnets or pole arrangements in one embodiment can be distributed in any quantity close to the rotor surface or close to the casing surface of the rotor or its rotor body.

This design then preferably mimics the function method of an asynchronous machine. The magnets or pole arrangements or their pole body elements are then able to orient themselves automatically using the applied stator field. Thus preferably, there is no need for learning the offset angle in a rotor position emitter system.

Furthermore, depending on actuation of the stator, arbitrary numbers of pole pairs can be generated. Furthermore, in the event of a fault (loss of actuation), the magnetic bars can orient themselves and favorably generate a magnetic short-circuit in the rotor. Thus preferably, even at high rotation speeds, voltages are no longer induced and the motor is permanently in a safe state.

It is also advantageous if the bar magnets or pole body elements or the pole arrangements are oriented in the manner known from permanent magnet energized motors, e.g. in a V-shaped arrangement. Here too, orientation of the bar magnets may be influenced by the stator.

Alternatively, it is also possible to provide a mechanical device or movement mechanism for targeted twisting of the bar magnets or pole arrangements. The bar magnets can be twisted either all simultaneously or individually or in groups.

Twisting may take place either discretely (i.e. in just two positions) or continuously adjustably, or in defined intermediate steps. Maximum flexibility allows a correspondingly better controllability, but also requires a correspondingly more complex actuation.

In the known fashion, twisting of magnets inside an existing magnetic field may require very high forces. Since actuation for twisting the bars or pole arrangements must take place inside the rotor diameter, it must be ensured that these forces are reduced as far as possible.

In this context, it is advantageous to wait for a favorable rotor position relative to the stator field set at the time; alternatively, it is also possible to generate a stator field in targeted fashion (for example by superposition), which can reduce the necessary twist forces.

It is also advantageous if the bars or pole arrangements are twisted by a stator field and then locked mechanically, using a brake for example.

It is furthermore also possible to produce asymmetric arrangements by individual actuation, for example in a preferential direction.

BRIEF DESCRIPTION OF THE DRAWINGS

The disclosure is now explained in more detail below with reference to exemplary embodiments in conjunction with associated drawings. The drawings show diagrammatically.

DETAILED DESCRIPTION

In the description which follows, the same reference signs are used for the same objects.

Figure 1:
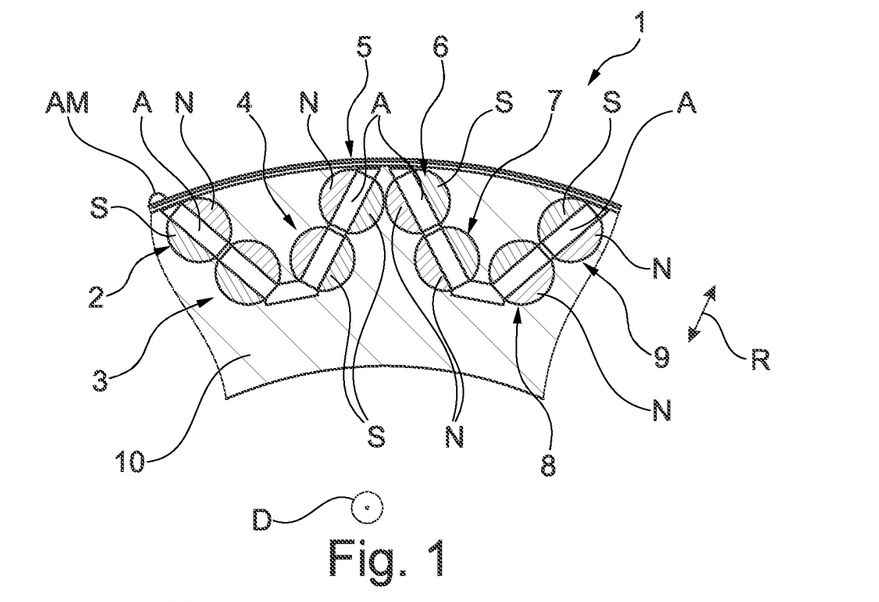
FIG. 1 a sectional view of a rotor according to the disclosure in a first exemplary embodiment.

FIG. 1 shows a sectional view of a rotor 1 according to the disclosure in a first exemplary embodiment.

More precisely, FIG. 1 shows a motor 1 of the electrical machine 20 formed as an internal rotor motor.

The rotor 1 has a rotor body 10 and an axis of revolution D which extends in the axial direction and about which the rotor 1 or the rotor body 10 can be rotated.

The rotor 1 furthermore has an outer casing surface AM which delimits the rotor 1 or the rotor body 10.

The rotor 1 furthermore has various pole arrangements 2, 3, 4, 5, 6, 7, 8, 9, wherein each pole arrangement 2-9 has a magnetic pole N, S or a first pole N and a second pole S.

Here, each pole arrangement 2-9 or each pole of the pole arrangements 2-9 is formed by a magnetic pole body element or a permanent magnet.

According to FIG. 1, each pole arrangement 2-9 or its pole body element is formed as a bar and has a circular cross-sectional surface. The bar form extends in the direction of the axis of revolution D.

Here, two pole body elements N, S in each case form a pole arrangement 2-9, wherein the pole body elements each form approximately half the shape of a pole arrangement 2-9.

In other words, each pole arrangement 2-9 has a symmetrical shape, in which the geometric center and the center of mass coincide in order to allow rotation about a rotation axis of the respective pole arrangement.

The rotation axis A is oriented substantially parallel to the axis of revolution D.

The pole arrangements 2 to 5, and 6 to 9, each form a V-shaped arrangement wherein the pole arrangements 2/3 and 4/5, and 6/7 and 8/9, have different distances from the outer casing surface AM of the rotor 1.

The pole arrangements 2, 5, 6, 9 are thus closer to the casing surface AM than the pole arrangements 3, 4, 7, 8.

The rotor 1 also has a movement mechanism for the pole arrangements 2, 5, 6 and 9, wherein the movement mechanism is configured such that the pole arrangements 2, 5, 6 and 9 are movable about a rotation axis A which is oriented substantially parallel to the axis of revolution D of the rotor 1. In this way, pole arrangements 2, 5, 6, 9 are also movable or rotatable about their rotation axis A, in addition to the rotation about the axis of revolution D of the rotor 1.

Again, expressed in other words, only the two pole arrangements 2, 5, or 6, 9 with the smallest distance from the outer casing surface AM are rotatable about their rotation axis A.

Although not shown concretely, the movement mechanism however also comprises an actuator for moving the pole arrangements 2, 5, 6, 9, wherein the movement mechanism may comprise a hydraulically or pneumatically operable actuator, or an electrical actuator, in particular an electric motor.

Also, the movement mechanism (not shown) is arranged between the axis of revolution D and a pole arrangement 2, 5, 6, 9 which is spaced from the axis of revolution D in the radial direction R. In this way, the centripetal acceleration on the movement mechanism can be kept low, whereby operation of the actuator requires less force in comparison with an arrangement of the movement mechanism between the casing surface AM and a pole arrangement 2, 5, 6, 9.

Also, the movement mechanism is formed as a hollow cylinder, in order to receive the pole arrangements 2, 5, 6, 9 in its interior.

Here, the movement mechanism has its own axis of revolution or rotation axis, wherein the movement mechanism is configured so as to be rotationally symmetrical to its rotation axis A.

In concrete terms, the movement mechanism has a bearing unit via which the pole arrangements 2, 5, 6, 9 are freely rotatable. The bearing unit may be a roller bearing which receives the magnetic pole body elements of the pole arrangements 2, 5, 6, 9 in a rotatable fashion.

In this context, the term "freely rotatable" means that the pole arrangements 2, 5, 6, 9 or their pole body elements can be twisted fully variably, so that continuous adjustment of the rotor 1 or an electrical machine 20 is possible.

It is also possible to twist the pole arrangements 2, 5, 6, 9 or their pole body elements either all simultaneously or individually or in groups. The twist may thus take place either discretely (e.g. in precisely two positions) or be adjusted continuously or take place in defined intermediate steps. Maximum flexibility allows a correspondingly better controllability but also requires corresponding actuation.

As an alternative to the actuator, the movement mechanism may comprise a lock (not shown) per pole arrangement 2, 5, 6 and 9, which is configured in the manner of an external brake and acts from the outside on the pole arrangements 2, 5, 6 and 9 in order to limit their movement.

The lock comprises various adjustment positions, so that for example in one adjustment position, the distance between a first pole body element N of a pole arrangement 2, 5, 6, 9 and the outer casing surface AM is smaller than the distance between a second pole body element S of a pole arrangement 2, 5, 6, 9 and the outer casing surface AM.

Figure 2:
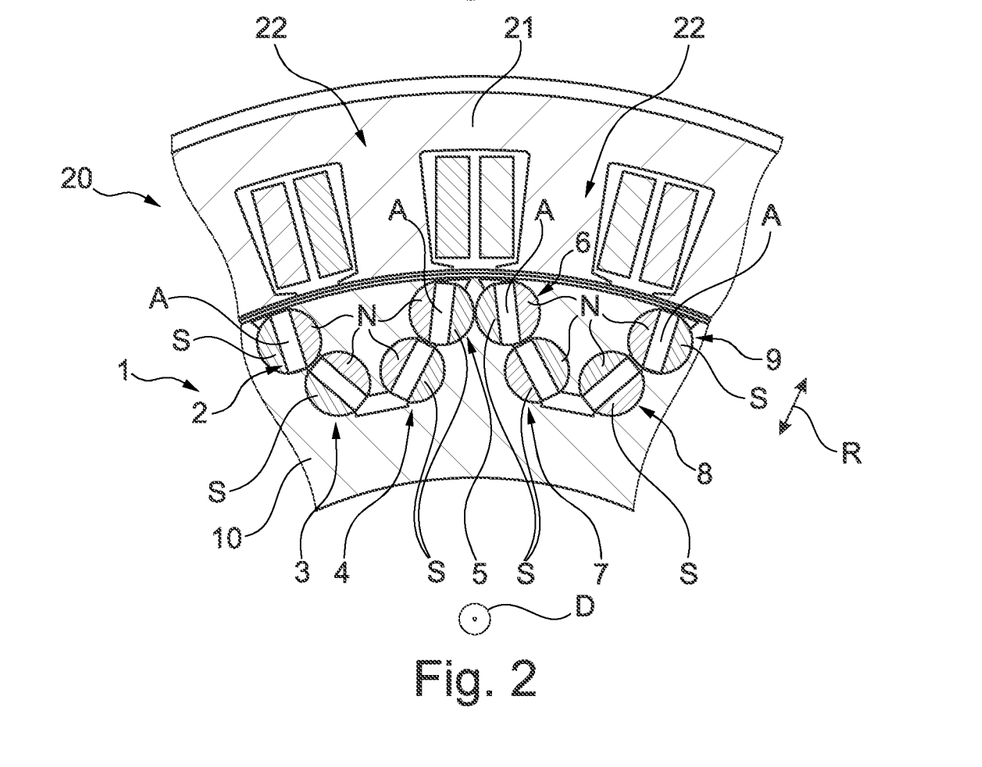
FIGS. 2 to 4 a sectional view of an electrical machine according to the disclosure in a first exemplary embodiment.
Figure 3:
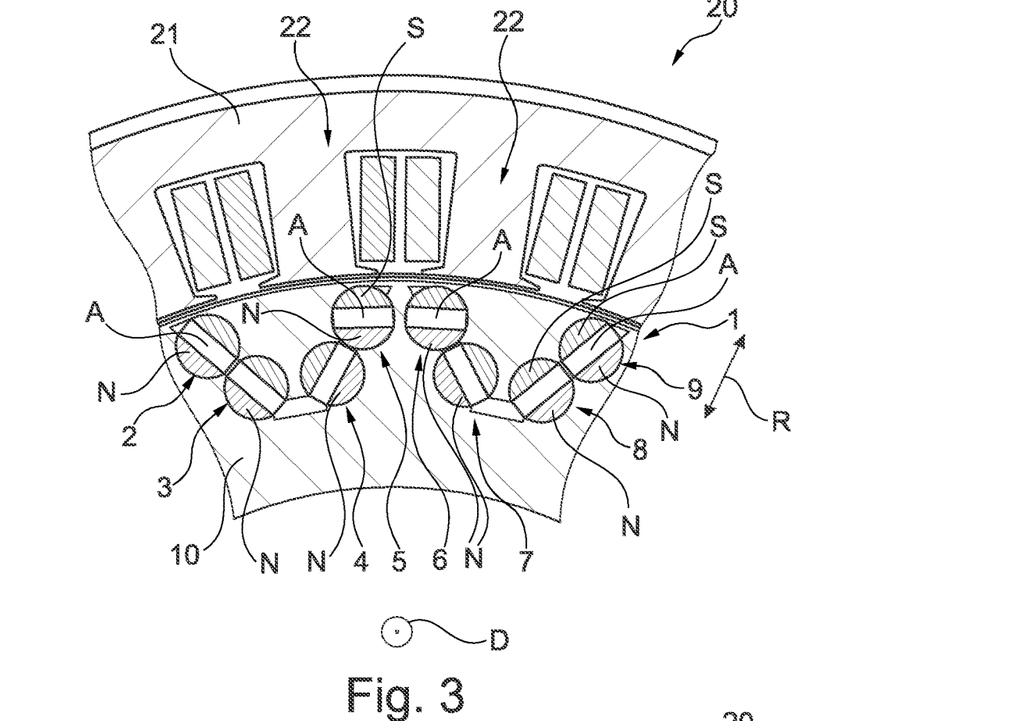
Figure 4:
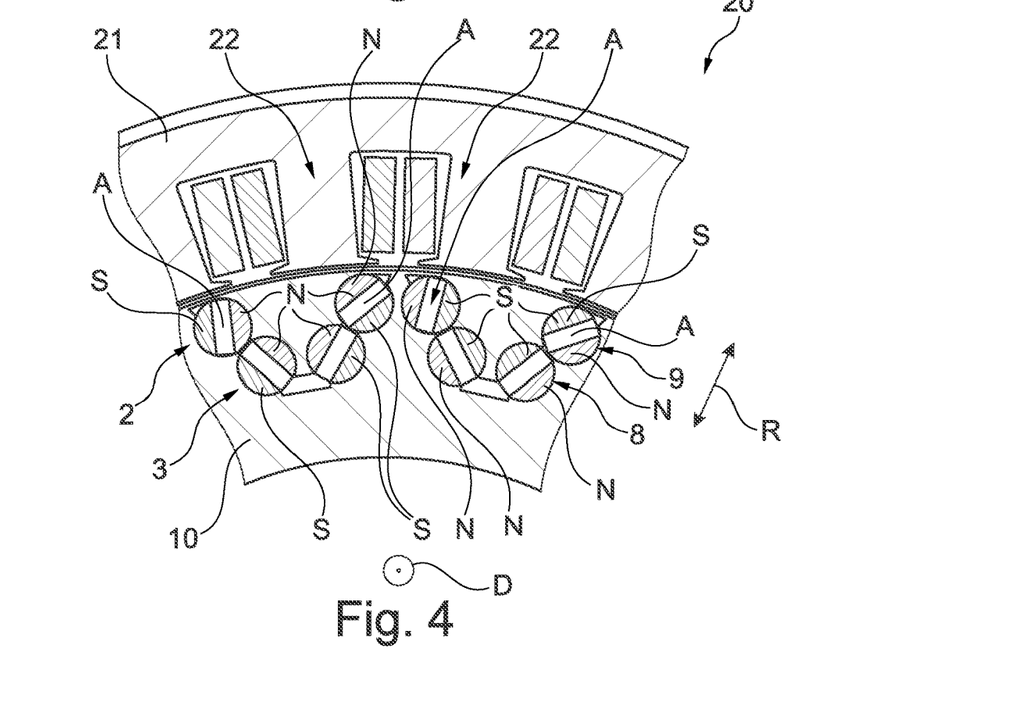

FIGS. 2 to 4 show a sectional view of an electrical machine 20 according to the disclosure in a first exemplary embodiment.

The figure shows an electrical machine 20 with a rotor 1 as explained above, and a stator 21 surrounding the rotor 1.

The rotor 1 and the stator 21 are spaced apart from each other in the radial direction R, in order to form an air gap between the two, wherein the electrical machine 20 comprises an axis of revolution D about which the rotor 1 can be rotated.

Furthermore, as already known, the rotor 1 has a rotor body 10 and an outer casing surface AM which delimits the rotor 1 or rotor body 10.

Furthermore, the rotor 1 comprises various pole arrangements 2-9 and a movement mechanism for the pole arrangement 2, 5, 6, 9, wherein each pole arrangement 2-9 comprises a magnetic pole N, S.

Here too, the movement mechanism is configured such that the pole arrangements 2, 5, 6, 9 are movable about a rotation axis A of the movement mechanism which is oriented substantially parallel to the axis of revolution D of the rotor 1. In this way, the magnetic poles N, S of the pole arrangements 2, 5, 6, 9 are configured so as to be rotatable relative to the stator 21 and the rotor 1.

Furthermore, FIG. 2 shows that the stator 21 comprises several stator pole arrangements 22 for generating a magnetic field.

In the present exemplary embodiment, the movement mechanism has a lock for the pole arrangements 2, 5, 6, 9, wherein the lock comprises several adjustment positions.

Here, the adjustment positions are shown with different orientations of the first pole N and hence also the second pole S of the pole arrangements 2, 5, 6, 9 to the stator 21 in FIGS. 2 to 4, and 6 to 8.

In order to transfer the pole arrangements 2, 5, 6, 9 from one adjustment position to another, in operation of the electrical machine 20, within a defined time interval, several stator pole arrangements 22 generate an electromagnetic counter-field to the electromagnetic field of the pole arrangements 2, 5, 6, 9 of the rotor 1.

In this way, e.g. after releasing the lock in a first adjustment position, the pole arrangements 2, 5, 6, 9 can be rotated according to the forces generated by the electromagnetic fields, whereby the pole arrangements 2, 5, 6, 9 can be rotated and then locked in the second adjustment position by means of the lock.

Figure 5:
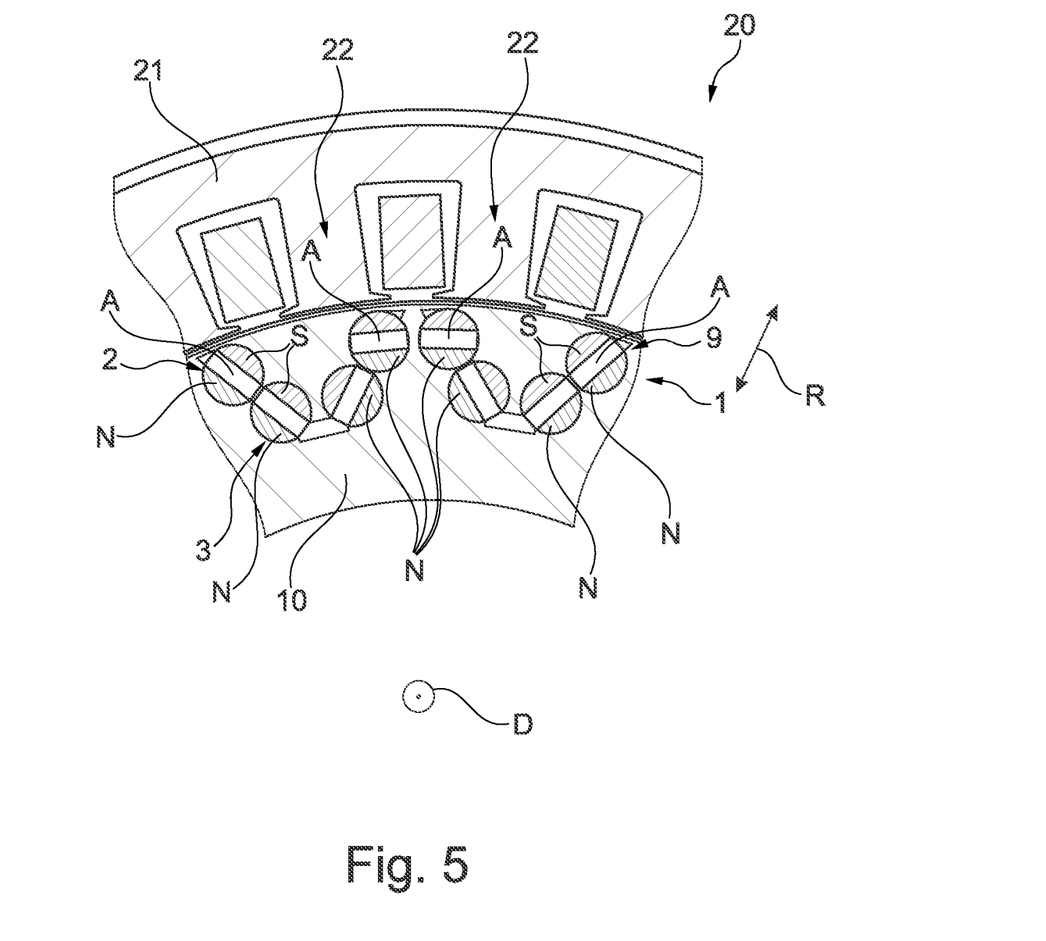
FIG. 5 a sectional view of an electrical machine according to the disclosure in a second exemplary embodiment.

FIG. 5 shows a sectional view of an electrical machine 20 according to the disclosure in a second exemplary embodiment.

In a comparison of the electrical machines 20 in FIGS. 2 to 4 and that in FIG. 5, it is evident that in FIGS. 2 to 4, an indicated coil wire is wound around one stator tooth in each case.

In the second exemplary embodiment in FIG. 5 however, the coil wire of the stator pole arrangement is wound around various stator teeth.

Figure 6:
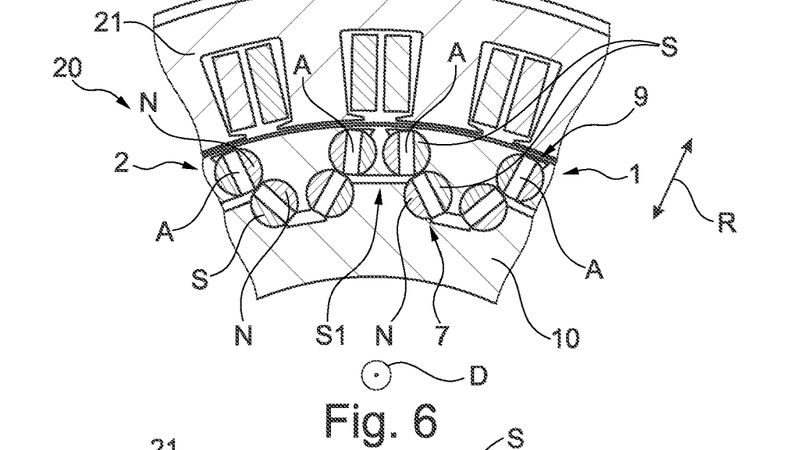
FIGS. 6 to 8 a sectional view of an electrical machine according to the disclosure in the first exemplary embodiment, with a rotor according to a second exemplary embodiment.
Figure 7:
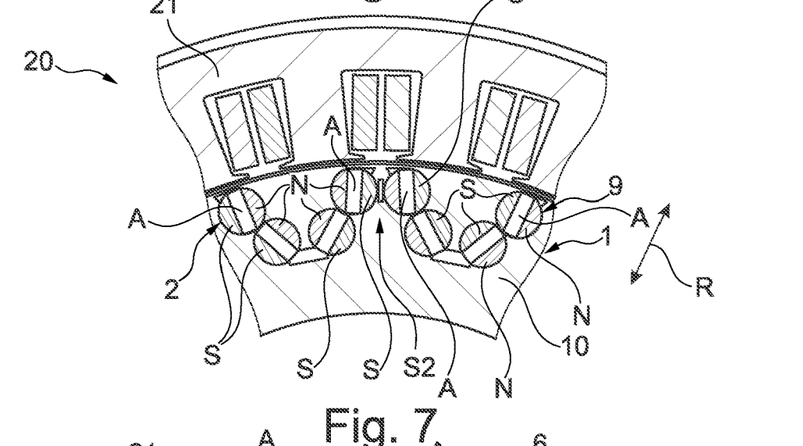
Figure 8:
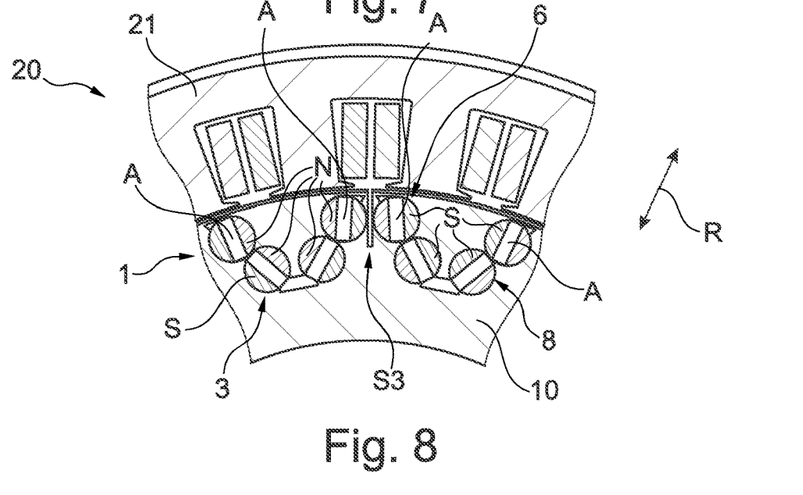

FIGS. 6 to 8 show a sectional view of an electrical machine 20 according to the disclosure in the first exemplary embodiment, with a rotor 1 according to a second exemplary embodiment.

In contrast to the rotor 1 in FIGS. 1 to 5, the rotor 1 in FIGS. 6 to 8 comprises a magnetic flux block S1, S2, S3 which is arranged between two pole arrangements 5, 6 or 4, 5, 6, 7.

Here, the magnetic flux block S1 extends in the circumferential direction U, whereas the magnetic flux blocks S2, S3 extend in the radial direction R.

LIST OF REFERENCE SIGNS

1 Rotor
2 Pole arrangement
3 Pole arrangement
4 Pole arrangement
5 Pole arrangement
6 Pole arrangement
7 Pole arrangement
8 Pole arrangement
9 Pole arrangement
10 Rotor body
20 Electrical machine
21 Stator
22 Stator pole arrangement
A Rotation axis of movement mechanism and rotation axis of a pole arrangement
AM Outer casing surface
D Axis of revolution
N First/magnetic pole
R Radial direction
S Second/magnetic pole
T Tangential direction
U Circumferential direction
X Axial direction

The invention claimed is:

1. A rotor for an electrical machine, comprising:
a rotor body,
an axis of revolution which extends in an axial direction and about which the rotor body is rotatable,
an outer casing surface which delimits the rotor body,
at least one pole arrangement configured to be movable about a rotation axis which is oriented substantially parallel to the axis of revolution of the rotor, wherein the at least one pole arrangement is also movable about the rotation axis in addition to rotation about the axis of revolution of the rotor, and
wherein at least three pole arrangements have different distances from the outer casing surface of the rotor, wherein only two of the at least three pole arrangements with the smallest distance from the outer casing surface are moveable about a respective rotation axis.

2. The rotor as claimed in claim 1,
wherein the at least one pole arrangement is movable between at least a first and a second adjustment position,
wherein, in one adjustment position a distance between a first pole body element of the pole arrangement and the outer casing surface is less than the distance between a second pole body element of the pole arrangement and the outer casing surface.

3. The rotor as claimed in claim 1,
wherein the at least one pole arrangement has a first pole and/or a second pole, and
wherein the at least one pole arrangement comprises at least one magnetic pole body element.

4. The rotor as claimed in claim 1,
wherein the at least one pole arrangement has a symmetrical shape, of which a geometric center and a center of mass coincide in order to allow rotation about the rotation axis,
wherein the at least one pole arrangement is configured as a rotatable bar,
wherein the at least one pole arrangement has a circular cross-sectional surface,
wherein the at least one pole arrangement is formed from at least two pole body elements which each form half a shape of the at least one pole arrangement, and
wherein the least three pole arrangements form a V-shaped arrangement or a spoke-like arrangement.

5. The rotor as claimed in claim 1,
wherein the rotor comprises at least one magnetic flux block,
wherein the at least one magnetic flux block is arranged between two pole arrangements,
wherein the at least one magnetic flux block extends in a radial direction and/or in a circumferential direction.

6. An electrical machine comprising:
a rotor and a stator surrounding the rotor,
wherein the rotor and the stator are spaced apart from each other in a radial direction in order to form an air gap therebetween,
wherein the electrical machine comprises an axis of revolution about which the rotor is rotatable,
wherein the rotor has a rotor body and an outer casing surface which delimits the rotor,
wherein the rotor comprises at least one pole arrangement, wherein the at least one pole arrangement comprises a magnetic and/or magnetizable pole, wherein the magnetic and/or magnetizable pole of the pole arrangement is formed so as to be rotatable relative to the stator and the rotor, and wherein at least three pole arrangements have different distances from the outer casing surface of the rotor, wherein only two of the at least three pole arrangements with the smallest distance from the outer casing surface are movable about a respective rotation axis.

7. The electrical machine as claimed in claim 6, wherein the stator comprises at least one stator pole arrangement for generating a magnetic field, wherein the at least one pole arrangement is movable between at least a first and a second adjustment position, wherein, in the first adjustment position, a first pole of the at least one pole arrangement is oriented towards the stator, wherein, in the second adjustment position, a second pole of the at least one pole arrangement is oriented towards the stator, and wherein, within a definable time interval, the at least one stator pole arrangement generates an electromagnetic counter-field to the electromagnetic field of the at least one pole arrangement of the rotor, in order to allow rotation of the pole arrangement according to forces produced by the electromagnetic fields, whereby the at least one pole arrangement can be rotated from the first adjustment position into the second adjustment position and then locked.

* * * * *